July 11, 1961

R. S. ROTE 2,991,549

METHOD FOR USE IN CONNECTION WITH THE
FABRICATION OF PLASTIC-CLAD STEEL

Filed Nov. 26, 1958

INVENTOR.
Richard Snyder Rote.
BY
ATTORNEY.

July 11, 1961
R. S. ROTE
2,991,549
METHOD FOR USE IN CONNECTION WITH THE
FABRICATION OF PLASTIC-CLAD STEEL
Filed Nov. 26, 1958
2 Sheets-Sheet 2
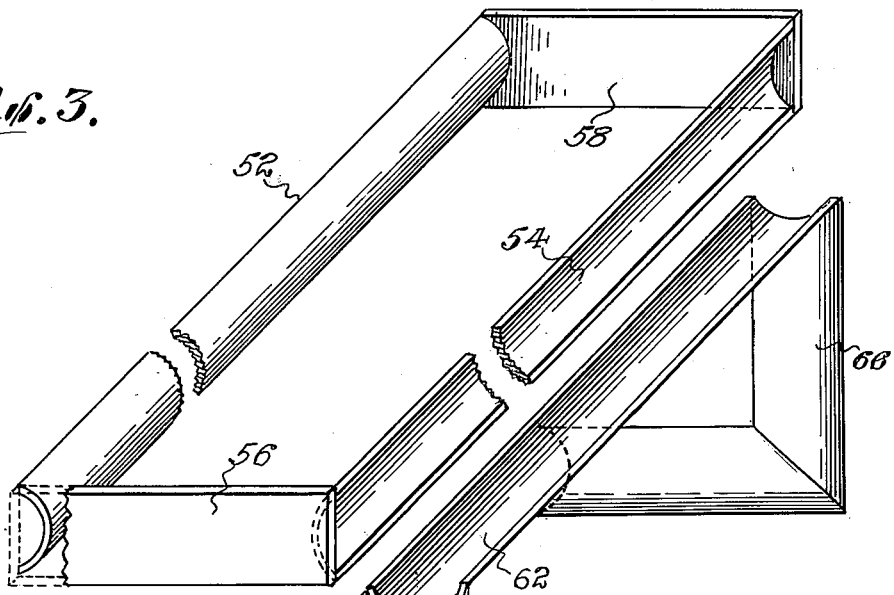
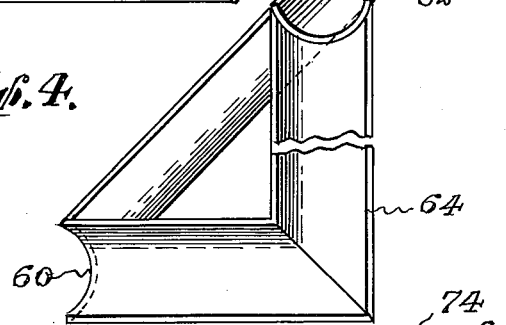
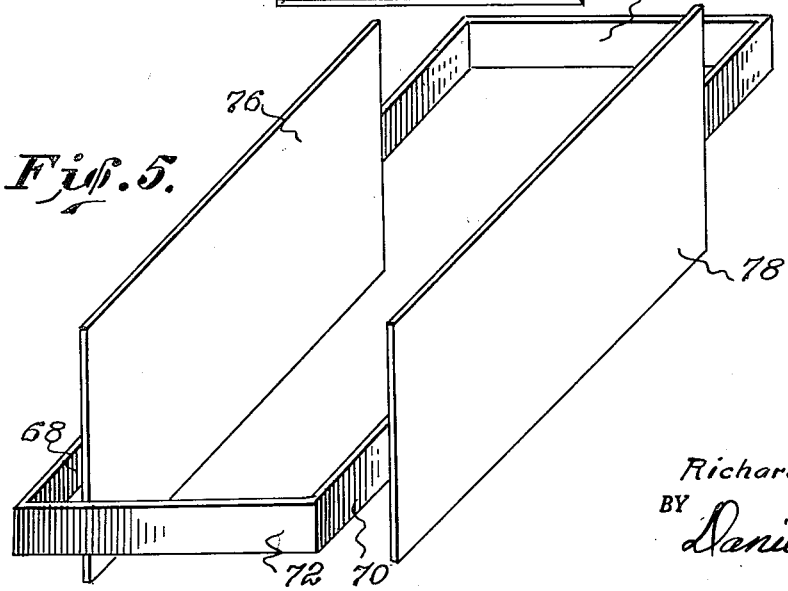
INVENTOR.
Richard Snyder Rote.
BY
ATTORNEY.

2,991,549
METHOD FOR USE IN CONNECTION WITH THE FABRICATION OF PLASTIC-CLAD STEEL
Richard Snyder Rote, Coatesville, Pa., assignor to Lukens Steel Company, Coatesville, Pa., a corporation of Pennsylvania
Filed Nov. 26, 1958, Ser. No. 776,623
4 Claims. (Cl. 29—471.1)

This invention relates to an apparatus and method for use in connection with the fabrication of plastic-clad steel, and has particular application to methods relating to the joining by welding or other heat treatments of the metallic sheets or plates to each other.

The principal object of the invention is to provide an apparatus for holding the plastic-clad layers away from the heating zone when the metal sheets or plates are subjected to the heating operations, such as welding and gas cutting.

An additional object is to provide a means for separating the ends of the plastic coating, which serves not only to hold, during the aforesaid heating operation, the ends of the plastic sheets from the heating zone, but also to provide a shield for absorbing the heat from said heating zone.

A further object is to provide adjustable means for use in connection with the aforesaid plastic sheet end holding means.

Other objects will appear hereinafter throughout the specification.

In the drawings:

FIGURE 3 is a perspective view of the third form of the invention;

FIGURE 4 is a perspective view of the fourth form of the invention; and

FIGURE 5 is a perspective view of the fifth form of the invention.

Plastic-clad constructions, which may consist of a layer of stainless steel or other alloy or non-alloy steel, are bonded to a non-metallic layer of plastic material. In various commercial practices, and particularly where it is desired to protect the steel from the corrosive influences of acids, alkalies, and other chemicals which adversely affect the steel layer, it has been found that a combination of steel with plastic results in a satisfactory product. The steel, or other metallic layer, provides the necessary strength characteristic and the plastic layer, which is the layer exposed to the acids or other corrosive media, ensures against corrosion. For example, a tank car, a swimming pool, petroleum distillation apparatus, and containers for various types of chemicals may be constructed from plastic-clad.

During the fabrication of these articles, particularly when they are of large size, it becomes necessary to weld the abutting ends of juxtaposed plates forming the metallic layers to each other. Inasmuch as the present practice is to manufacture plastic-clad in sheets of definite length and width, it becomes necessary to weld a plurality of said sheets to each other in fabricating the article of manufacture. The butt ends of the plates, in order to be structually strong, are usually welded to each other. Prior to the welding operation some means must be employed to peel back or roll back the plastic layer ends which overlie the abutting metallic side edges of the plastic-clad, and hold said plastic sheets in such rolled back position during the welding operation.

The present invention provides this means for holding the turned back side or end edges of the plastic layer during the welding operation. This holding means may also be employed as a heat shield whereby to prevent the intense heat incident to the welding operation from reaching the plastic layer during the said welding operation.

Figure 1:
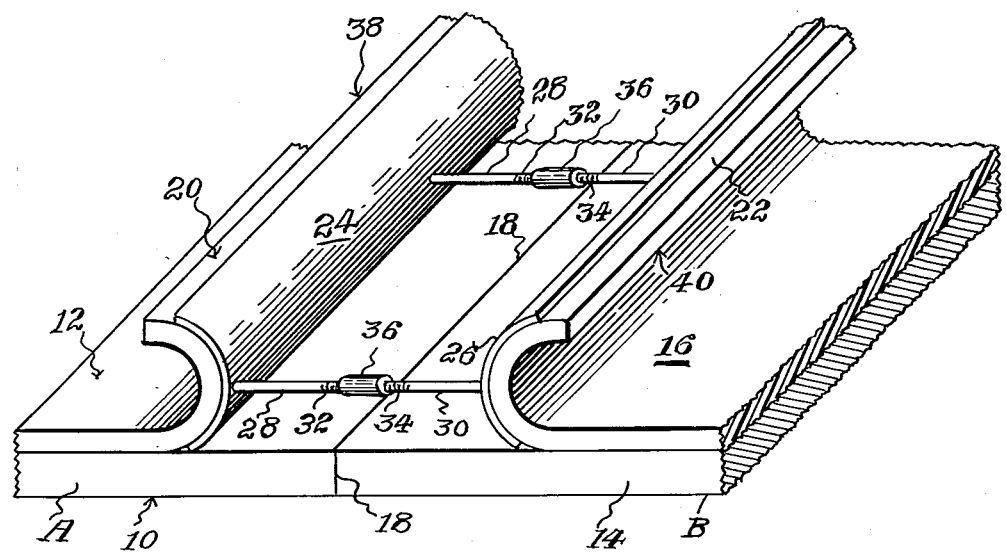
FIGURE 1 is a perspective view partly broken away of one form of the apparatus of this invention, and showing a broken away section of the plastic-clad steel.

Referring now to the first form of the invention, illustrated in FIGURE 1, two plastic-clad sheets are indicated by the letters A and B, the former comprising a metallic sheet or slab 10 and a plastic sheet 12 bonded thereto, the latter also comprising a metallic sheet or slab 14 and a plastic sheet 16 bonded thereto.

Assuming it is desired to weld the sheets 10 and 14 to each other along their adjacent meeting side or end edges designated by the numeral 18, it becomes necessary to break the bond between the plastic sheets prior to rolling them away from the edges 18, and this may be accomplished by any suitable means in order to roll these end portions away from each other and away from the meeting edges 18 of the slabs or plates. The plastic sheet edges must be held in this position during the welding operation.

As shown in FIGURE 1, only parts of the plastic-clad structures are shown, but it will be understood that the edges 18 extend for the entire width or length of the plastic-clad elements.

The rolled edges 20 and 22 of the plastic layer may be loosened from the underlying metal surfaces by the use of a heated knife or by any suitable means, such as by a chipping tool. When the end portions are rolled back, as seen in FIGURE 1, they are held in position away from the edges 18 during the welding operation by the pair of arcuate shaped members 24 and 26. It will be understood that these arcuate shaped members extend for the entire distance which comprises the length of the weld of the edges 18. Spaced along the length of the arcuate members 24 and 26 and affixed thereto by welding, brazing, or riveting, are stud members 28 and 30, respectively. These stud members are positioned substantially medially of the arc of curvature of the arcuate shaped members 24 and 26 and extend toward each other, as seen in FIG. 1, on parallel axes. In other words, stud member 28 is directly opposite stud member 30, this being for the purpose of joining these two members to each other.

In the structure shown in FIGURE 1, stud members 28 are provided with threaded ends 32, and stud members 30 are provided with threaded ends 34. Each threaded end 32 may be rigidly joined with a threaded end 34 by a nut 36. Each of these nuts is provided with oppositely turned internal threads, not shown, for engagement with the oppositely turned threads 32 and 34 of the stud members 28 and 30. Rotation of the nut 36 in either one or the other direction will result in moving the ends of the stud members 28 and 30 toward or from each other. It will be noted that these stud members and the nut which connects each pair of them are spaced away from the edges 18 in order that they will not interfere with the welding operation.

After the plastic edges have been rolled back and secured by the arcuate shaped members, each of the nuts 36 is tightened to hold these rolled edges in proper spaced position, and the arcuate shaped members serve as heat shields whereby to dissipate the heat due to the welding operation and prevent melting of the plastic ends 20 and 22.

Following completion of the welding operation and cooling of the weld joint, nuts 36 are loosened to the point where the arcuate shaped members may be readily released from engagement with the rolled back end portions of the abutting plastic layers. These layers may then be again attached to the metallic sheets or slabs 10 and 14, this being accomplished by applying a suitable adhesive coating to the upper exposed surfaces of the slabs 10 and 14 and/or to the under surfaces of the rolled back plastic sheets 12 and 16, or these under surfaces may be partially melted by the application of heat to them so that they will again adhere to the exposed metal surfaces. Additionally, the meeting edges 38 and 40 of the plastic layer should be welded to each other in a leakproof manner, either by the addition of any suitable sealing or adhesive substance, many of which are known in the art, in order to prevent any corrosive liquid in contact with the upper surface of the plastic layer from finding its way between the meeting edges 38 and 40. Should such corrosive liquids find their way to the metal surfaces, they would attack the weld and the metallic sheets A and B and negate the whole purpose of the plastic layer.

Figure 2:
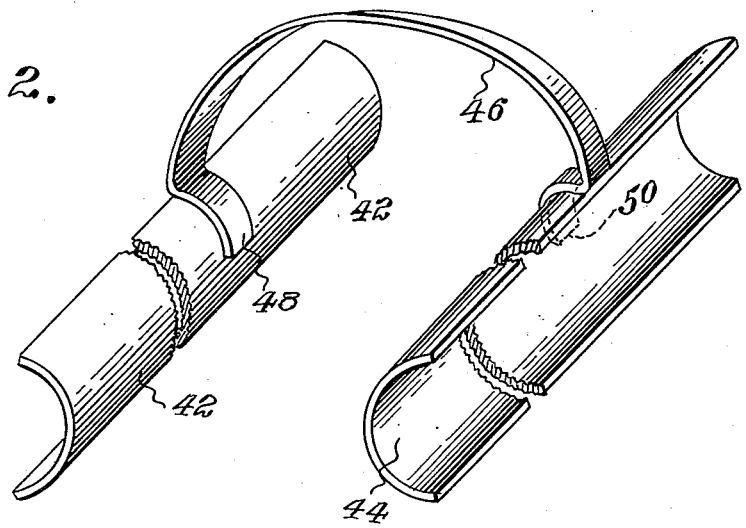
FIGURE 2 is a perspective view of a second form of the invention.

In the construction shown in FIGURE 2, a pair of arcuate shaped members 42 and 44 have been substituted for the arcuate shaped members 24 and 26 of the construction heretofore described. It will be understood that these arcuate plate members are of such size that they extend the entire distance which is defined by the meeting edges of the metallic plates. In other words, the width of the arcuate shaped members 42 and 44 would be equal to the meeting edges corresponding to the meeting edges 18 of FIG. 1. One or more bridge members, indicated at 46, is provided with ends 48 and 50, which are preferably attached to the members 42 and 44 by welding, but these may be affixed by rivets or any other suitable rigid attaching means. It will be understood that the arcuate shaped members 42 and 44 perform the same function as the corresponding members 24 and 26 of FIG. 1, except that in the FIG. 2 construction it will be impossible to adjust the members 42 and 44 toward or from each other. It will be further understood that the bridge 46 may have sufficient resiliency to permit the members 42 and 44 to be readily removed from the rolled back edges of the plastic sheets.

In the structure shown in FIGURE 3, the arcuate shaped members are indicated at 52 and 54. The length of these arcuate shaped members corresponds generally to the length of the end or side edges noted at 18 in FIGURE 1.

The ends of the arcuate shaped members 52 and 54 are joined to each other by welding or other suitable attaching means which may comprise the two end pieces 56 and 58. These are rigidly attached. It will be noted that the concave sides of the arcuate members 52 and 54 are intended for the purpose of spacing and holding the rolled back end portions of the plastic sheets in the same manner as the arcuate shaped members 24 and 26 function, as illustrated in FIGURE 1. The plastic sheet end portions are rolled back and the device of FIGURE 3 is dropped into position so as to hold the rolled back edges in position during the welding operation when the welding rods or torch are inserted between the arcuate shaped members 52 and 54.

The FIGURE 4 construction is adapted for the fabrication of plastic-clad steel elements which are joined to each other to form a right-angled joint. The arcuate shaped members 60 and 62 are located at right angles to each other and the right angle is formed by end pieces 64 and 66.

Referring now to FIGURE 5, a rigid frame comprising long side pieces 68 and 70 and short end pieces 72 and 74 is formed of any siutable material which is not unduly affected by heat. Attached to the long sides 68 and 70 are the plates 76 and 78. Assuming that the meeting edges of the plastic layers have been rolled back, say to a position approximately that shown in FIGURE 1, the frame with its long and short side pieces is dropped into the position whereby the rolled back edges of the plastic layers will abut against and be held by the plates 76 and 78. With the parts in this position, the welding of the confronting edges of the metallic slabs may be safely proceeded with without injury to the plastic layer end, inasmuch as the sheets 76 and 78 not only hold the confronting edges of the plastic sheets away from each other but also serve to dissipate the heat incidental to welding of the side edges of the metallic plates to form a unitary structure.

It will be understood that this invention, therefore, is directed in its several embodiments to the provision of a means for use in the fabrication of plastic-clad steel by the provision of means for holding the stripped back plastic layer during the welding operation on the base metal slab described.

Upon stripping back the plastic cladding from the steel base metal for a distance of several inches on either side of a fillet for butt welding, it becomes necessary to keep the plastic away from the high heat of the welding process in order to prevent softening or melting of the plastic, which because of its properties tends to return to its original position as cladding on the steel base metal.

The provision of the means for accomplishing this object, which means may consist of a metal bracket which may or may not have curved pieces or arcuate shaped members of various lengths, will serve to hold back the plastic cladding during welding of the base steel. The metal pieces or shields which engage the rolled back plastic cladding ends may be of any suitable shape or length to suit the metal to be worked upon. The apparatus may be installed in position for holding the plastic-clad end portions in rolled back position during welding, and it may then be removed at will. The apparatus may be quickly and easily moved into and out of operative position, and may be used indefinitely, since replacement will be unnecessary. The apparatus is preferably composed entirely of metal.

The word "steel" in the specification and claims is intended to include ferrous metals and their alloys as well as other metals which may be fabricated by heat treatment.

It will be understood that various shapes and sizes may be employed whereby to accomplish the objects of this invention, which consist in forming a holding means for temporarily holding the side edges of the plastic sheets away from each other during the welding operation which joins the metallic slabs to each other and fabricates various shaped objects, such as joining the heads of tanks to the cylindrical body portions thereof, or of joining the angled sides of various types of receptacles and other objects during the fabrication thereof.

The above description and drawings disclose several embodiments of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

I claim:

1. A method of fabricating plastic-clad steel comprising the steps of temporarily rolling back the flexible portions adjacent the meeting edges of a pair of plastic-clad members each having a plastic layer bonded to a base steel layer until the said edges have been moved a distance from the abutting edges of the steel layers, engaging said rolled back edges with a spacing apparatus holding the rolled back edges of the plastic members a distance from each other to continuously expose the steel surfaces for welding, and welding the juxtaposed edges of the base steel layers to each other while continuously shielding the rolled back edges of said plastic layers, then releasing the rolled back edges of the plastic layer.

2. A method of fabricating plastic-clad steel comprising the steps of temporarily rolling back the flexible portions adjacent the meeting edges of a pair of plastic-clad members each having a plastic layer bonded to a base steel layer until the said edges have been moved a distance from the abutting edges of the steel layers, engaging said rolled back edges with a spacing apparatus holding the rolled back edges of the plastic members a distance from each other to continuously expose the steel surfaces for welding, and welding the juxtaposed edges of the base steel layers to each other, while continuously shielding the rolled back edges of said plastic layers, then releasing the rolled back edges of the plastic layer and affixing the released edges to the base metal, and sealing said edges of the plastic layer to each other in a fluid tight manner.

3. A method of fabricating plastic-clad steel comprising the steps of temporarily rolling back the flexible portions adjacent the meeting edges of a pair of plastic-clad members each having a plastic layer bonded to a base steel layer until the said edges have been moved a distance from the abutting edges of the steel layers, engaging said rolled back edges with a spacing apparatus holding the rolled back edges of the plastic members a distance from each other to continuously expose the steel surfaces for welding, and welding the juxtaposed edges of the base steel layers to each other while shielding the rolled back layers from the welding heat, then releasing the rolled back edges of the plastic layer.

4. A method of fabricating plastic-clad steel comprising the steps of temporarily rolling back the flexible portions adjacent the meeting edges of a pair of plastic-clad members each having a plastic layer bonded to a base steel layer until the said edges have been moved a distance from the abutting edges of the steel layers, engaging said rolled back edges with a spacing apparatus holding the rolled back edges of the plastic members a distance from each other to continuously expose the steel surfaces for welding, and welding the juxtaposed edges of the base steel layers to each other while shielding the rolled back layers from the heat of the welding operation, then releasing the rolled back edges of the plastic layer and affixing the released edges to the base metal, and sealing said edges of the plastic layer to each other in a fluid tight manner.

References Cited in the file of this patent

UNITED STATES PATENTS

| | | |
|---|---|---|
| 1,656,258 | Yale | Jan. 17, 1928 |
| 1,805,181 | Miller | May 12, 1931 |
| 1,978,164 | Van Inwagen et al. | Oct. 23, 1934 |
| 2,148,427 | Howard et al. | Feb. 28, 1939 |
| 2,314,950 | Pope | Mar. 30, 1943 |
| 2,768,105 | Dittmore et al. | Oct. 23, 1956 |
| 2,786,264 | Colombo | Mar. 26, 1957 |
| 2,851,771 | Pottmeyer | Sept. 16, 1958 |
| 2,862,543 | Kaminsky | Dec. 2, 1958 |
| 2,930,117 | Wilson | Mar. 29, 1960 |